O. & J. METZ.
Gate-Latch.

No. 209,702.　　　　　　Patented Nov. 5, 1878.

WITNESSES
Villette Anderson.
F. J. Masi.

INVENTORS
Oliver Metz,
John Metz.
by E. W. Anderson,
ATTORNEY

UNITED STATES PATENT OFFICE.

OLIVER METZ AND JOHN METZ, OF ST. JOHN'S, OHIO.

IMPROVEMENT IN GATE-LATCHES.

Specification forming part of Letters Patent No. 209,702, dated November 5, 1878; application filed September 14, 1878.

*To all whom it may concern:*

Be it known that we, OLIVER METZ and JOHN METZ, of St. John's, in the county of Auglaize and State of Ohio, have invented a new and valuable Improvement in Gate-Latches; and we do hereby declare that the following is a full, clear, and exact description of the construction and operation of the same, reference being had to the annexed drawings, making a part of this specification, and to the letters and figures of reference marked thereon.

Figure 1:
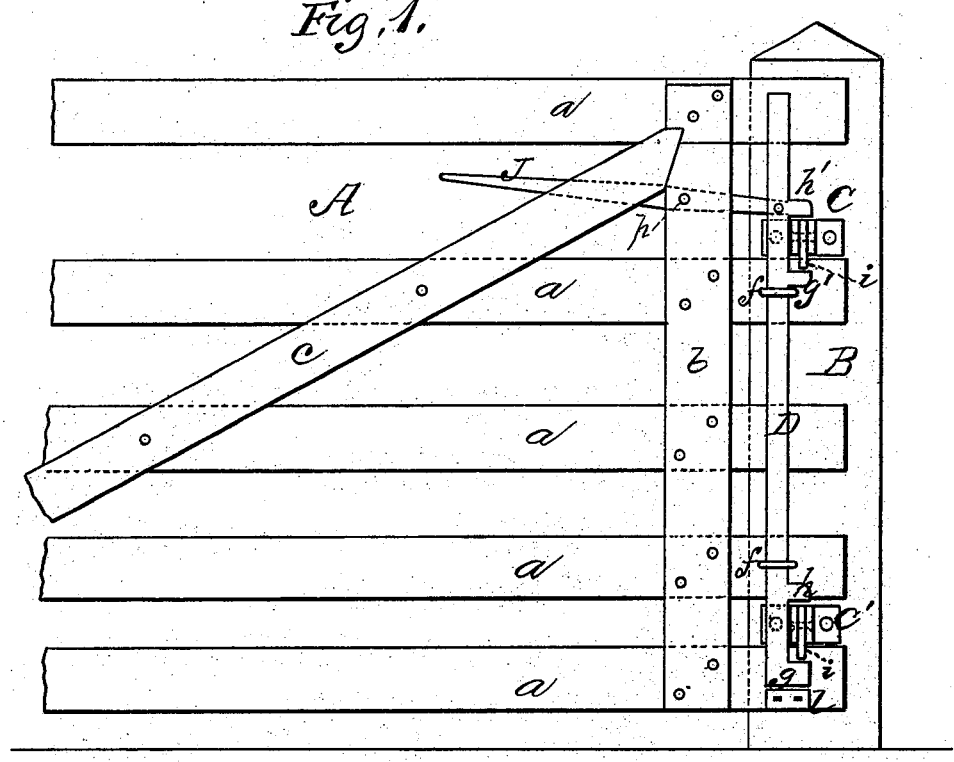
Figure 2:
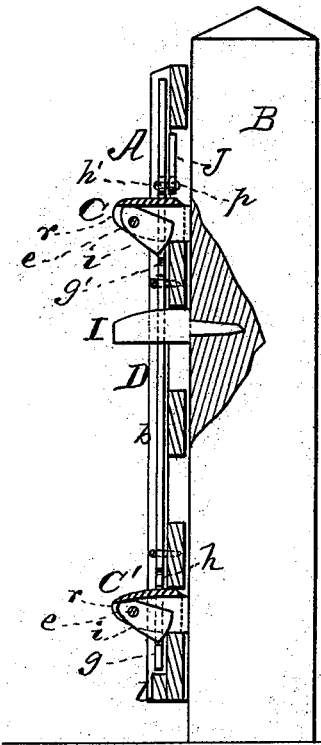

Figure 1 of the drawings is a representation of a front view of a gate, showing our improved latch applied, and Fig. 2 is a front view of the lock-post, showing the latching device in section.

This invention has relation to improvements in gate-latches.

The object of the invention is to devise a latch for gates that will act automatically to lock the same, that will prevent the gate from warping out from its posts, and to improve such devices generally.

The nature of the invention consists in combining with the lock-post of a gate having brackets projecting therefrom and recessed upon their under sides, and the gravitating dogs pivoted in said recesses, a gate having its rails arranged to raise said dogs, to pass beyond them, and to allow them to drop over their edges, and a vertically-movable latch-bar having the lugs extending under and across said dogs, stops to limit the play of said latch-bar, and a lever-handle pivoted to the gate and engaging the said bar, as will be hereinafter more fully set forth and claimed.

In the annexed drawings, the letter A designates a gate closing the gap between the post B and a corresponding post, (not shown,) and hinged in any suitable manner to said adjoining post.

The rails $a$ of the gate are braced together by the vertical uprights $b$ and the diagonal bars $c$, (only one of which is shown in the drawing,) the ends of said rails extending beyond the post B and abutting against it when the gate is closed. C C' indicate brackets projecting out horizontally from post B, the former above one of the upper rails of the gate, and the latter above one of the lowermost rails thereof. These brackets are each provided with a gravitating dog, $i$, pivoted thereto, and dropping downward, as shown in Fig. 2, their fall being limited by the striking of their heels against the top of the said brackets. These latter are cleft from below at their ends for the admission of the dogs, being thus a shield from the weather. These brackets will usually be cast complete with the recess $r$ upon their under sides for the reception of the dogs, which will be secured thereto by a pivot, $e$. When the gate is closed the ends of its rails strike the dogs, cause them to swing up into the recesses $r$, and, after passing beyond, allow them to drop into the position shown in Fig. 2, thus latching the gate.

D indicates a metallic latch-bar arranged at the free end of the gate and having endwise movement in the guide-staples $f$. This bar has a projecting lug, $g$, extending under and across the lower dog, and a similar lug, $g'$, in a like position relative to the upper dog, which, when the said bar is raised, cause the dogs to swing up into the recesses $r$ of the brackets above the upper edges of the adjacent rail ends, and thus allow the gate to be opened. The bar is raised by means of a lever, J, having its fulcrum on a bolt, $p$, between the end uprights of the gate, and pivoted to the said bar, the longer end of the said lever being carried between and protected from injury by the diagonal braces.

The upward movement of the latch-bar is limited by a stop-lug, $h$, above the lower bracket and below the lowest guide-staple, and its downward movement by a similar lug, $h'$, above the top bracket, and a stop, $l$, secured to the gate just below lug $g$. When the gate is fully closed it rests upon a horizontal support, I, projecting from the post B.

It will be seen that the gate, being latched to the post above and below, is not liable to warp out from the said post and form a gap through which the smaller domestic animals, as pigs and lambs, can readily pass into and out of an inclosure. It will also be seen that the gate cannot be raised and opened by vicious cattle who have acquired the habit of forming a gap in an inclosure by lifting off the rails successively from the top of the fence, because the brackets project over and rest on the tops of the rails of the gate. It will furthermore be seen that the supporting-arm I effectually prevents the gate from sagging.

Having thus described our invention, we claim as new, and desire to secure by Letters Patent, the following:

1. In a gate-latch, the combination, with the post B, having the brackets C C', each of which is provided with a gravitating dog, $i$, recessed into its under side, of the hinged gate A, having the vertical latch-bar D, provided with lugs $g$ $g'$ extending under said dogs, substantially as specified.

2. The combination, with the post B, having brackets C C', recessed upon their under sides at $r$, and the gravitating dogs $i$ pivoted in said recesses, of the gate A, having its rails arranged to raise said dogs, pass beyond them, and to allow them to drop over the rail, and the latch-bar D, having the lugs $g$ $g'$ extending under and across said dogs, and a lever pivoted to the gate and engaging said latch-bar, substantially as specified.

In testimony that we claim the above we have hereunto subscribed our names in the presence of two witnesses.

OLIVER METZ.
JOHN METZ.

Witnesses:
   F. C. LAYTON,
   W. V. M. LAYTON.